INVENTOR.
JOHN HALLER
BY
Barthel & Bugbee
ATTORNEYS

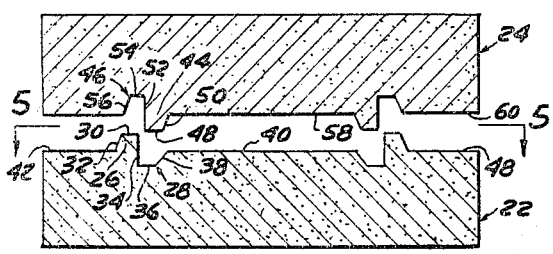
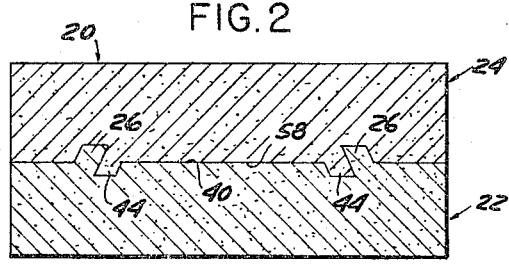
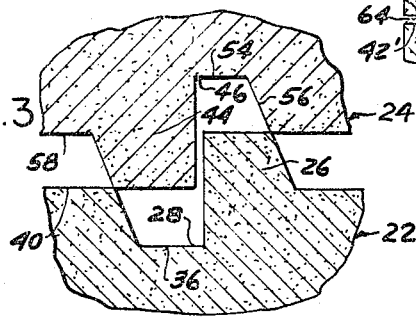
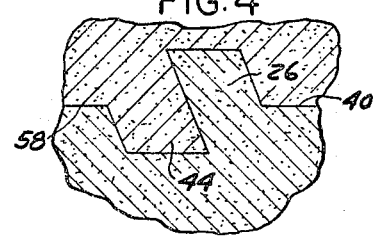
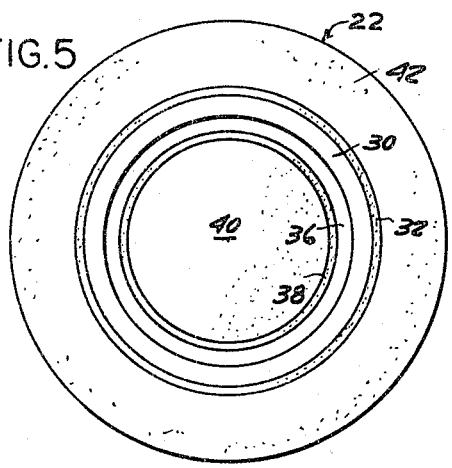
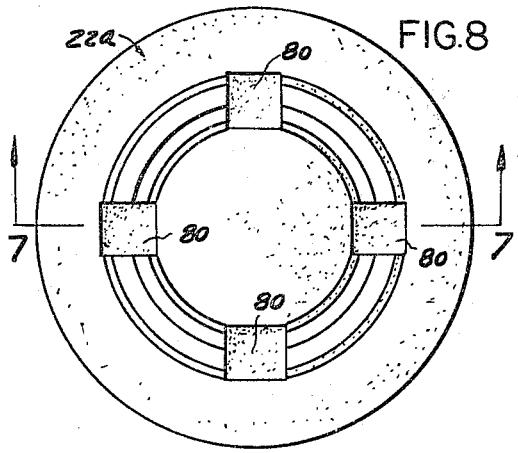
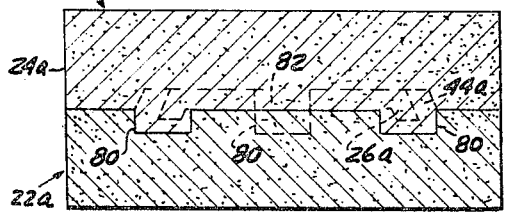
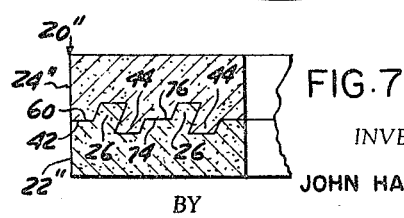

Patent body

3,324,544
CONSTRUCTION AND PROCESS FOR UNITING SINTERED POWDERED METAL PARTS
John Haller, Northville, Mich., assignor to Federal-Mogul-Bower Bearings, Inc., Detroit, Mich., a corporation of Michigan
Filed Mar. 13, 1964, Ser. No. 351,736
5 Claims. (Cl. 29—521)

This invention relates to sintered powdered metal articles and processes and, in particular, to the uniting of separately-produced sintered powdered metal parts.

Hitherto, it has been difficult to produce certain workpieces in powdered metal because of their complexity, particularly as regards the pressing of intricately configured briquettes of powdered metal prior to sintering them. On the other hand, the machining of such workpieces from solid metal also entails extremely high labor costs and thus, in effect, renders many such workpieces infeasible to manufacture except in the few instances where cost is a secondary matter, such as in military equipment and space vehicles. The present invention provides simple and effective means for producing complex workpieces by dividing them into component parts which are separately produced and then united firmly to one another by the improved procedures and constructions of the present invention. This enables the production of complex workpieces at moderate cost without ordinarily requiring machining.

Accordingly, one object of the present invention is to provide a construction and process of producing complex articles by dividing them into component parts which are separately made and sintered, these component parts having means associated therewith which, when subjected to certain mechanical operations, cause the parts to become firmly united and inseparable under ordinary conditions of use.

Another object is to provide a construction and process of the foregoing character wherein the faces of the component parts to be adjoined are provided with opposing projections and depressions which are slightly displaced laterally relatively to one another yet almost but not quite aligned with one another in an axial direction in such a manner that when the parts are pressed into engagement with one another in said axial direction, lateral deformation of said projections occurs as they engage the opposing aligned surfaces of said depressions, causing said projections to interlock with one another in a joint which is for all practical purposes inseparable except when subjected to extremely great axial tension forces not ordinarily encountered in practical use of the parts.

Another object is to provide a construction and process as set forth in the preceding object wherein the opposing part faces to be adjoined are provided with deformation-producing or material-deflecting surfaces which by their interaction during the application of uniting pressure produce the lateral deformation of the projection which brings about the interlocking engagement of the component parts.

Another object is to provide a construction and process of the foregoing character wherein the projections and depressions are substantially annular in shape, with or without optional lugs or keys to prevent relative rotation where the workpiece is subsequently subjected to torque or rotational forces.

Another object is to provide a construction and process of the foregoing character wherein the interlocking opposing projections may be either single or multiple, depending upon the severity of the conditions of use tending to cause separation of the component parts, such as, for example, two or more sets of interlocking projections, preferably concentric annular sets.

Another object is to provide a construction and process of the foregoing character wherein an optional clearance is optionally provided between the united interlocking parts for the additional insertion of a bonding or securing material, such as a brazing metal, in order to enhance and amplify the adherence of the component parts to one another where the workpiece is intended for heavy duty and subjected to excessive forces which might otherwise overpower the interlocking projections and pull the parts apart.

Another object is to provide a modified construction and process wherein the component parts to be united are provided with circumferentially-spaced multiple interlocking projections and depressions with which are incorporated deflection-producing portions adapted to cause lateral deformation and interlocking when the component parts are forced into tight engagement with one another.

Other objects and advantages of the invention will become apparent during the course of the following description of the accompanying drawings, wherein:

FIGURE 1 is a central vertical section through two component parts of a workpiece about to be pressed into interlocking engagement with one another, according to the present invention;

FIGURE 2 is a view similar to FIGURE 1, but showing the completed workpiece after its component parts have been pressed into interlocking engagement with one another;

FIGURE 3 is an enlarged detail section of the about-to-be-interlocked portion of FIGURE 1;

FIGURE 4 is a similarly enlarged detail of an interlocked portion of FIGURE 2;

FIGURE 5 is a top plan view of the lower component part, the upper part being of similar configuration but of slightly different dimensions;

FIGURE 6 is a fragmentary central vertical section through a second form of the invention similar to the first form shown in FIGURES 1 to 5 inclusive, but additionally providing a clearance space between the mechanically-united parts into which a bonding material has been inserted to enhance the strength of the joint for workpieces subjected to heavy duty conditions;

FIGURE 7 is a fragmentary central vertical section through a third form of the invention employing plural sets of interlocking projections and depressions, after uniting has occurred, the particular workpiece shown for purposes of example being a ring;

FIGURE 8 is a top plan view of a fourth form of the invention additionally employing circumferentially-spaced interlocking lugs and depressions over the construction shown in FIGURE 5, so as to prevent subsequent relative rotation between the united component parts;

FIGURE 9 is a vertical section taken along the line 9—9 in FIGURE 8;

Figure 10:
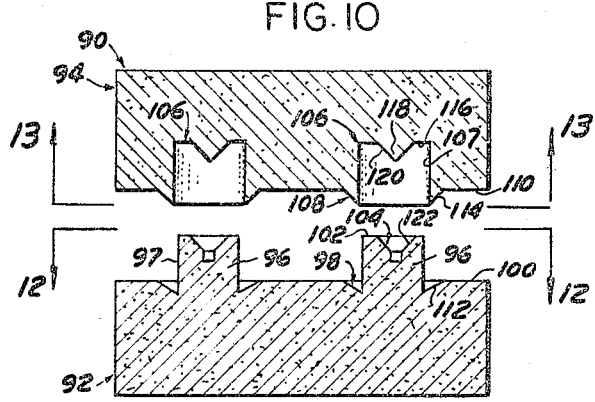
FIGURE 10 is a central vertical section through a fifth form of the invention with the component parts about to be united, wherein the parts are provided with circumferentially-spaced multiple interlocking projections and depressions which when subjected to pressure are deflected laterally into interlocking engagement with one another.
Figure 13:
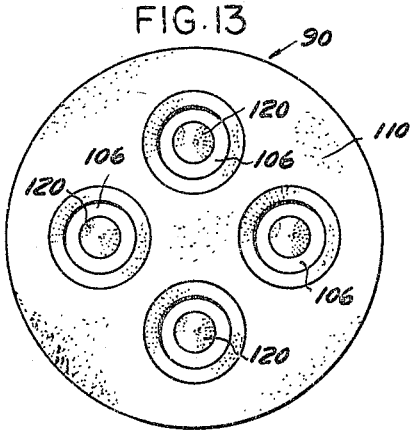
Figure 14:
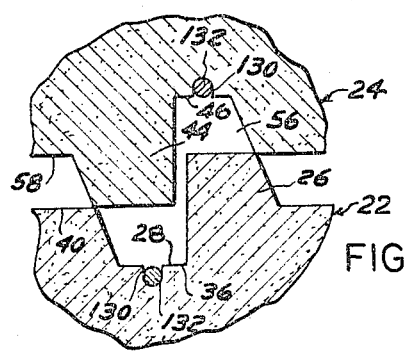

FIGURE 13 is a bottom plan view of the upper component part of FIGURE 10, looking in the direction of the arrows 13—13; and FIGURE 14 is an enlarged detail section of the about-to-be-interlocked portions of a modification of FIGURE 1, wherein annular grooves are formed in the recess bottoms and rings of brazing metal are secured therein before assembly, to be subsequently melted by the application of heat to further secure the parts to one another.

Referring to the drawings in detail, FIGURES 1 to 5 show a sintered powdered metal workpiece, generally designated 20, according to one form of the invention having component parts 22 and 24 which have been mechanically united to one another by the interlocking means and method of the present invention as set forth below. For simplicity of illustration, the workpiece 20 has been shown as a cylindrical body, but it will be understood that workpieces of great complexity of shape can be produced according to the present invention. The component parts 22 and 24 are of similar but opposite shapes, differing slightly in dimensions from one another in order to bring about the deformation and deflection which mechanically interlock the component parts 22 and 24.

The lower component part 22 is provided with an annular projection 26 disposed immediately outwardly from an annular depression 28. The projection 26 has a flat top surface 30, an inclined conical outer surface 32 and a straight cylindrical inner surface 34 of greater height than the conical surface 32, which it shares with the depression 28 as the outer surface thereof. The depression 28 has a substantially flat bottom surface 36 and an inclined inner conical surface 38. In addition, the component part 22 has inner and outer flat top surfaces 40 and 42 respectively preferably located on the same level.

The upper component part 24 of the workpiece 20 similarly has an annular projection 44 disposed immediately upward from a surrounding annular depression 46, both being of sufficiently less diameters than the opposing annular projection 26 and depression 28 of the lower component part 22 so that they lie immediately above and in alignment with the annular depression or recess 28 and projection 26 (FIGURES 1 and 3). The projection 44 of the upper component part 24 has a flat top surface 38, an inner annular conical surface 50 and an outer cylindrical surface 52 of greater height which it shares with the annular depression 46. The latter is provided with a flat annular bottom surface 54, and an outer conical surface 56. The upper component part 24 also has an inner flat bottom surface 58 opposite the inner flat top surface 40 of the lower component 22 and an outer flat bottom surface 60 on the same level and opposite the flat top surface 42 of the workpiece 20.

The two component parts 22 and 24 are formed as briquettes in correspondingly configured dies by conventional briquetting methods and apparatus, using conventional powdered metal or other powdered material, such as powdered iron, powdered bronze, powdered nylon or the like. The component parts 22 and 24 are then subjected to conventional sintering processes in conventional sintering ovens, thereby converting the so-called "green" or fragile unsintered briquettes into strong and firm sintered powdered metal articles. The two component parts 22 and 24 are then placed in alignment in a conventional press in the opposing positions shown in FIGURE 1 and subjected to pressing operations, the lower component part 22 preferably resting on the bed of the press and the upper component part 24 subjected to the action of the descending press platen.

During the pressing operation, the upper projection 44 encounters the inclined conical surface 38 of the lower component part 22 which is inclined more nearly to the horizontal than the corresponding inclined surface 50 of the upper component part 24, a camming or deflecting action occurs whereby the lower end 48 of the upper projection 44 is forced horizontally outward into penetrating engagement with the inner surface 34 of the lower projection 26, the porosity of the sintered powdered metal of the parts 22 and 24 permitting such deflection, and deformation and penetration. At the same time, the top 30 of the lower projection 26 is engaging the inclined conical surface 56 of the upper depression 46 and is deflected horizontally inward, the inclined conical surface 56 being inclined more nearly to the horizontal than the opposing lower conical surface 32 of the lower component part 22 so that the top 30 of the lower projection 26 is forced into penetrating engagement with the side wall 52 of the upper projection 44. Here, again, the porosity of the material permits this deflection, deformation and penetration of the sintered powdered metal material. The pressing ends when the corresponding outer surfaces 32 and 60 and the corresponding inner surfaces 40 and 58 of the lower and upper component parts 22 and 24 come into abutting engagement with one another (FIGURE 2).

As a result of the opposite horizontal deflections of the projections 26 and 44 of the lower and upper components 22 and 24 respectively, the opposing projections interlock with one another in the manner shown in FIGURE 2, wherein the inclinations are shown in slightly exaggerated form. In consequence of the deflection and deformation of the projections 26 and 44 by reason of the porosity of the sintered powdered metal or other sintered powdered material of which they are formed, the component parts 22 and 24 become tightly interlocked and cannot be separated from one another by the application of moderate tension forces.

According to a second form of the invention shown in FIGURE 6, the interlocking joint already mechanically established by the foregoing construction and procedure is further strengthened by so constructing the component parts 22 and 24 that the corresponding projections 26' and 44' are higher than their corresponding recesses 28' and 46'. Consequently, when pressing is completed, the opposing lower and upper horizontal surfaces 40', 42' and 58', 60' are separated from one another by inner and outer gaps or clearances 62 and 64, access to the inner gap 62 being obtained through one or more holes or ports 66 or 68 in the lower or upper components 22' or 24'.

Upon completion of the pressing operation (FIGURE 6), the operator flows or otherwise inserts a bonding material in inner and outer layers 70 and 72 in the gaps 62 and 64 respectively, conventional brazing metal having been found satisfactory for this purpose. As a result, when the brazing metal or other bonding material 70 and 72 have solidified, it produces an additional gripping engagement between the lower and upper components 22' and 24' over and beyond that exerted by the interlocking projections 26' and 44'.

According to a third form of the invention shown in FIGURE 7, the mechanical grip uniting the two components 22" and 24" of the workpiece 20" is further increased by providing additional interlocking means to that shown in the workpiece 20 of FIGURES 1 to 5 inclusive, namely two or more sets of interlocking projections. In particular, the lower component 22" is provided with two sets of upstanding projections 26 interlocking with downward projections 44 on the upper component part 24", the same reference numerals for the projections being employed in FIGURE 7 as in FIGURE 1 because of their identical construction. The lower and upper components 22" and 24" are formed by briquetting powdered metal in similarly-configured dies in the same manner as that described above for the workpiece 20 of FIGURES 1 to 5 inclusive, except that the additional interlocking projections are provided concentric with the original one shown in FIGURES 1 to 5 inclusive, assuming the workpiece 20" to be cylindrical for purposes of illustration. The two rows of projections are separated from one another by flat surfaces 74 and 76 respectively.

Pressing of the double-row projections of FIGURE 7 is carried out in the same manner as that of FIGURES 1 to 5 inclusive, causing similar deflection and deformation of the projections 26 and 44 by the camming action of the inclined conical surfaces 38, 50 and 32, 56. As a result, the two rows of projections 26 and 44 are simultaneously deflected and deformed by lateral displacement of the sintered powdered metal thereof. This results in the interlocking construction shown in FIGURE 7 in a manner similar to that described above and shown in FIGURE 2.

The fourth form of the invention shown in FIGURES 8 and 9 is employed where it is desired to prevent relative rotation between the component parts, for example, where the workpiece is subjected to torque forces. The construction is the same as that shown in FIGURE 1 with the interlocking projections 26a and 44a for the lower and upper component parts 22a and 24a, except that these projections, instead of being continuous, are arcuate and separated from one another by recesses 80 in the lower component part 22a into which fit lugs or key portions 82 depending from the upper component part 24a. Except for these differences, the lower and upper component parts 22a and 24a are briquetted in similar dies by similar processes from powdered metal or other sinterable powdered material such as nylon, and consequently sintered as described above in connection with FIGURES 1 to 5 inclusive.

After sintering, the lower and upper component parts 22a and 24a are placed in vertically-aligned positions similar to that shown in FIGURE 1, with the lugs 82 aligned with their respective recesses 80 (FIGURE 9). Pressing is then carried out as described above to force the projections 26a and 44a to be deflected and deformed laterally into interlocking engagement with one another while at the same time the lugs 82 telescope with their respective recesses 80, which form sockets for the lugs 82. In the subsequent use of the workpiece 20a thus formed, torque applied to one of the component parts 22a or 24a will be transmitted without relative rotation, to the other component part 24a or 22a because the lugs 82 and recesses 80 serve as keys engaging key seats to prevent such relative rotation.

The fifth form of the invention producing a workpiece, generally designated 90 and shown in FIGURES 10 to 13 inclusive, employs lower and upper component parts 92 and 94 respectively formed by briquetting powdered metal in suitable and correspondingly-shaped dies by conventional briquetting processes. Other sinterable powdered material, such as powdered nylon, may also be employed for this purpose. Here again for purposes of simplicity, the workpiece 90 has been illustrated as cylindrical in shape but, as before, more complicated shapes are contemplated which could not ordinarily be conveniently produced by conventional briquetting and sintering processes.

The lower component 92 is provided with upstanding circumferentially-spaced lugs or bosses 96 (FIGURE 10) surrounded at the bases of their side surfaces 97 by conical recesses or grooves 98 depressed below the flat surrounding top surface 100. In their upper ends 102, the bosses 96 are provided with central annular conical depressions 104. Aligned with the bosses 96, which are preferably of cylindrical shape, are sockets 106 with side surfaces 107 preferably of cylindrical shape, formed in the upper component part 94. The sockets 106 are surrounded by annular conical ridges 108 projecting downwardly from the surrounding flat surface 110. The conical annular grooves 98 have side surfaces 112 which are inclined more nearly to the horizontal than the side surfaces 114 of the ridges 108 so that when the latter encounter the former during the pressing operation, inward deflection occurs. Projecting downwardly from the bottom surface 116 of each socket 106 is a central conical protuberance 118 aligned with the conical depressions 104. The side surfaces 120 of the protuberances 118 are inclined more nearly to the horizontal than the side surfaces 122 of the depressions 104 so that spreading of the upper portion of the bosses 96 is brought about by their interengagement during the pressing operation, as described below.

Figure 11:
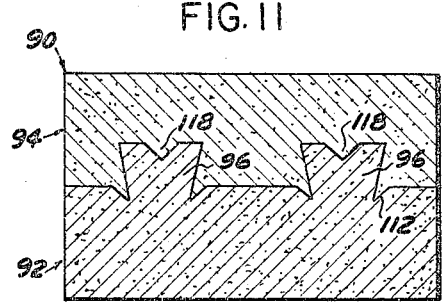
FIGURE 11 is a view similar to FIGURE 10 showing the workpiece after uniting has been accomplished.
Figure 12:
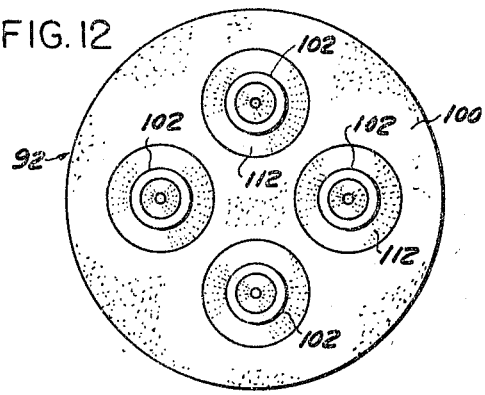
FIGURE 12 is a top plan view of the lower component part of FIGURE 10, looking in the direction of the arrows 12—12.

In the assembling of the component parts 92 and 94 into the completed workpiece 90, the lower component part 92 is preferably mounted on the bed of a press and the upper component part 94 aligned with it on the press platen. The press is then operated to move the platen and the upper component part 94 downward into engagement with the lower component part 92. As the conical ridges 108 encounter the more shallowly inclined conical depressions or grooves 98 surrounding the bases of the upstanding bosses 96, they are deflected inwardly into the side surfaces 97 of the bosses 96 while at the same time, the conical protuberances 118, being of shallower inclination than the depressions 104 spread the upper ends 102 of the bosses 96 outwardly into the side surfaces 107 of the sockets 106. The result, shown in somewhat exaggerated form in FIGURE 11, is an interlocking of the widened-topped bosses 96 with the widened-bottomed sockets 106. As a consequence, the lower and upper component parts 92 and 94 are thus inseparably interlocked with one another while at the same time relative rotation between them is effectively prevented in the event that torque forced are applied.

In the above examples, the words "upper" and "lower" have been used for convenience of distinguishing between the opposing components which, after the above-described partial deflection and deformation, become inseparably interlocked with one another. It will be evident, however, that the positions of the component parts as described above may be reversed, where more convenient for production purposes, so that what has been described herein as the lower component part then becomes the upper component part and vice versa.

The construction shown in FIGURE 14 is similar to that shown in FIGURES 1 to 5 inclusive, with the exception of the fact that annular grooves 130 are formed in the bottom surfaces 36 and 54 of the annular depressions 28 and 46 respectively by forming corresponding ridges on the briquetting punches during the briquetting operation. Rings 132 of brazing metal are then seated in the grooves 130 prior to assembly and the components 22 and 24 assembled in the manner described in connection with FIGURES 1 to 5 inclusive. Upon heating the assembly, the brazing metal of the rings 132 melts and unites itself securely to the adjacent portions of the components 22 and 24, thereby providing an additional connection which enhances the mechanical connection of the interlocking parts.

What I claim is:

1. A process of substantially inseparably joining two component parts of sintered powdered material into a composite workpiece, said process comprising forming upon said parts opposing projections and depressions with the projection on one part alignable with the depression on the other part, placing the two parts in juxtaposition with said projection aligned with said depression, pressing the parts together with the projection on said one part moving into contacting engagement with a surface of the depression on the other part, and continuing the pressing after such contacting engagement to effect lateral deformation of the end portion of said projection into penetrating interlocking engagement with a side wall of said depression, said projection having a recess in the end thereof and said depression having a bottom surface with a protuberance therein alignable with said recess and movable into laterally-deforming penetrating engagement with the side wall of said recess while displacing laterally the material of said side wall in response to said continued pressing.

2. A process, according to claim 1, wherein the side surface of said protuberance and the coacting side surfaces of said recess are disposed oblique to the direction of pressing engagement of the two parts.

3. A process, according to claim 1, wherein said projection also has a shallow cavity adjacent its junction with its respective part and wherein said recess has a protrusion adjacent the edge thereof aligned with said cavity when said projection is aligned with said recess, said cavity and said protrusion having coacting side surfaces which are disposed oblique to the direction of pressing engagement of the two parts, said protrusion deforming into penetrating engagement with said projection adjacent said junction in response to said pressing engagement of said projection with said protuberance.

4. A process of substantially inseparably joining two component parts of sintered powdered material into a composite workpiece, said process comprising
forming upon each part a projection and an adjacent depression with the projection on one part offset laterally into alignment with the depression on the other part,
the projection on each part and the depression aligned therewith on the opposite part having surfaces on one side thereof disposed in the direction of pressing engagement and movable freely past one another during such engagement, and on the opposite sides thereof having contacting surfaces disposed oblique to said direction and having laterally-deflecting engagement with one another,
pressing the parts together with the projection on said one part moving past the laterally-offset projection on said other part into contacting engagement with a surface within the depression on said other part, and continuing the pressing after such contacting engagement to effect lateral deformation of the end portions of said projections into penetrating interlocking engagement with one another.

5. A process, according to claim 4, wherein said first-mentioned projection and depression are of approximately annular configuration, including the additional step of forming on each of said parts an additional annular projection and depression disposed in laterally-spaced relationship with inside its first-mentioned projection and depression respectively, and pressing said additional projections and depressions into laterally deformed penetrating interlocking relationship to one another while performing said continued pressing.

References Cited

UNITED STATES PATENTS

| | | |
|---|---|---|
| 638,564 | 12/1899 | Davis. |
| 1,163,784 | 12/1915 | Skinner _____ 29—521 |
| 1,947,839 | 2/1934 | Fissell. |
| 2,563,992 | 8/1951 | De Grave. |
| 2,584,696 | 2/1952 | Graham _____ 29—522 X |
| 2,942,748 | 6/1960 | Anderson. |
| 2,995,821 | 8/1961 | Gordon. |

FOREIGN PATENTS 2,074    5/1900    Great Britain.

JOHN F. CAMPBELL, *Primary Examiner.*

CHARLIE T. MOON, *Examiner.*

L. J. WESTFALL, *Assistant Examiner.*